United States Patent
Hansen et al.

(10) Patent No.: US 9,117,226 B2
(45) Date of Patent: Aug. 25, 2015

(54) SYSTEM AND METHOD FOR DELIVERING AN AUTHORIZED IN-STORE PROMOTION TO A CONSUMER

(75) Inventors: Gregory Hansen, Township of Washington, NJ (US); Seth H. Sarelson, New York, NY (US); Johnathan A. Treiber, New York, NY (US)

(73) Assignee: OnCard Marketing, Inc., New York, NY (US)

( * ) Notice: Subject to any disclaimer, the term of this patent is extended or adjusted under 35 U.S.C. 154(b) by 416 days.

(21) Appl. No.: 13/007,824

(22) Filed: Jan. 17, 2011

(65) Prior Publication Data
US 2012/0143680 A1    Jun. 7, 2012

Related U.S. Application Data

(63) Continuation-in-part of application No. 12/958,984, filed on Dec. 2, 2010.

(51) Int. Cl.
*G06Q 30/02* (2012.01)

(52) U.S. Cl.
CPC ........ *G06Q 30/0241* (2013.01); *G06Q 30/0248* (2013.01)

(58) Field of Classification Search
CPC ...................... G06Q 30/0207; G06Q 30/0241
See application file for complete search history.

(56) References Cited

U.S. PATENT DOCUMENTS

| | | | |
|---|---|---|---|
| 3,824,544 A | 7/1974 | Simjian | |
| 3,833,795 A | 9/1974 | Shoshani | |
| 4,463,250 A | 7/1984 | McNeight | |
| 4,554,446 A | 11/1985 | Murphy et al. | |
| 4,641,347 A | 2/1987 | Clark | |
| 4,674,041 A | 6/1987 | Lemon et al. | |
| 4,725,718 A | 2/1988 | Sansone | |
| 4,794,530 A | 12/1988 | Yukiura | |

(Continued)

FOREIGN PATENT DOCUMENTS

| | | |
|---|---|---|
| CA | 2254378 | 10/1999 |
| WO | WO9427258 A2 | 11/1994 |

(Continued)

OTHER PUBLICATIONS

Non Final Office Action received for U.S. Appl. No. 13/028,514, mailed on Dec. 24, 2012, 42 pages.

(Continued)

*Primary Examiner* — Jacob C. Coppola
(74) *Attorney, Agent, or Firm* — Patent GC LLC

(57) ABSTRACT

A system and method for delivering an authorized in-store promotion to a consumer includes storing in an offer database a plurality of offer data items for use in creating an in-store promotion. The method further includes storing in an authorization database an authorization parameter. In response to receiving a request from a consumer device to present the in-store promotion, the server uses the authorization parameter to verify that the request is authorized without requesting additional information from a consumer operating the consumer device. When the request is authorized, the server dynamically generates the in-store promotion using at least one of the plurality of data items stored in the offer database. Once generated, the server transmits the in-store promotion to the consumer device without any system-specific client software to be stored by the consumer device.

17 Claims, 6 Drawing Sheets

(56) References Cited

U.S. PATENT DOCUMENTS

| | | | |
|---|---|---|---|
| 4,941,090 A | 7/1990 | McCarthy | |
| 4,965,437 A | 10/1990 | Nagai | |
| 5,117,355 A | 5/1992 | McCarthy | |
| 5,128,752 A | 7/1992 | Von Kohorn | |
| 5,227,874 A | 7/1993 | Von Kohorn | |
| 5,239,480 A | 8/1993 | Huegel | |
| 5,243,174 A | 9/1993 | Veeneman | |
| 5,283,422 A | 2/1994 | Storch et al. | |
| 5,285,278 A | 2/1994 | Holman | |
| 5,408,417 A | 4/1995 | Wilder | |
| 5,537,314 A | 7/1996 | Kanter | |
| 5,598,477 A | 1/1997 | Berson | |
| 5,636,346 A | 6/1997 | Saxe | |
| 5,710,886 A | 1/1998 | Christensen | |
| 5,715,399 A | 2/1998 | Bezos | |
| 5,724,520 A | 3/1998 | Goheen | |
| 5,732,398 A | 3/1998 | Tagawa | |
| 5,754,654 A | 5/1998 | Hiroya | |
| 5,761,648 A | 6/1998 | Golden et al. | |
| 5,797,126 A | 8/1998 | Helbling | |
| RE36,116 E | 2/1999 | McCarthy | |
| 5,870,718 A | 2/1999 | Spector | |
| 5,884,277 A | 3/1999 | Khosla | |
| 5,907,830 A | 5/1999 | Engel | |
| 5,937,391 A | 8/1999 | Ikeda et al. | |
| 5,945,653 A | 8/1999 | Walker et al. | |
| 5,948,040 A | 9/1999 | DeLorme | |
| 5,953,705 A | 9/1999 | Oneda | |
| 5,999,914 A | 12/1999 | Blinn et al. | |
| 6,029,141 A | 2/2000 | Bezos et al. | |
| 6,035,280 A | 3/2000 | Christensen | |
| 6,067,532 A | 5/2000 | Gebb | |
| 6,192,349 B1 | 2/2001 | Husemann | |
| 6,193,155 B1 | 2/2001 | Walker et al. | |
| 6,216,227 B1 | 4/2001 | Goldstein | |
| 6,222,914 B1 | 4/2001 | McMullin | |
| 6,223,166 B1 | 4/2001 | Kay | |
| 6,236,971 B1 | 5/2001 | Stefik | |
| 6,240,396 B1 | 5/2001 | Walker | |
| 6,243,688 B1 | 6/2001 | Kalina | |
| 6,321,208 B1 * | 11/2001 | Barnett et al. | 705/14.36 |
| 6,336,099 B1 | 1/2002 | Barnett et al. | |
| 6,345,261 B1 | 2/2002 | Feidelson et al. | |
| 6,386,451 B1 | 5/2002 | Sehr | |
| 6,473,790 B1 | 10/2002 | Tagi | |
| 6,505,179 B1 | 1/2003 | Kara | |
| 6,631,358 B1 | 10/2003 | Ogilvie | |
| 6,633,850 B1 | 10/2003 | Gabbard et al. | |
| 6,690,794 B1 | 2/2004 | Terao | |
| 6,826,594 B1 | 11/2004 | Pettersen | |
| 6,842,741 B1 | 1/2005 | Fujimura | |
| 6,868,402 B1 | 3/2005 | Hirota | |
| 6,904,408 B1 | 6/2005 | McCarthy et al. | |
| 6,999,936 B2 | 2/2006 | Sehr | |
| 7,013,286 B1 | 3/2006 | Aggarwal et al. | |
| 7,020,622 B1 | 3/2006 | Messer | |
| 7,127,419 B2 | 10/2006 | Messer et al. | |
| 7,249,056 B1 | 7/2007 | Crouthamel et al. | |
| 7,319,975 B2 | 1/2008 | Monteverde | |
| 7,330,971 B1 * | 2/2008 | Kukreja et al. | 713/168 |
| 7,401,032 B1 | 7/2008 | Golden et al. | |
| 7,540,415 B2 | 6/2009 | Frank | |
| 7,769,648 B1 | 8/2010 | Nolan | |
| 8,046,266 B1 | 10/2011 | Geller | |
| 8,050,969 B2 | 11/2011 | Golden et al. | |
| 8,201,735 B2 | 6/2012 | Frank | |
| 8,311,895 B1 | 11/2012 | Murugan | |
| 8,640,951 B2 | 2/2014 | Frank | |
| 8,666,838 B2 | 3/2014 | Bamborough | |
| 8,978,977 B2 | 3/2015 | Frank | |
| 2001/0049636 A1 | 12/2001 | Hudda et al. | |
| 2002/0002552 A1 | 1/2002 | Schultz et al. | |
| 2002/0010627 A1 * | 1/2002 | Lerat | 705/14 |
| 2002/0013728 A1 | 1/2002 | Wilkman | |
| 2002/0099606 A1 | 7/2002 | Shlagman | |
| 2002/0120507 A1 | 8/2002 | Chanos et al. | |
| 2002/0128903 A1 | 9/2002 | Kernahan | |
| 2002/0145038 A1 | 10/2002 | O'Hagan et al. | |
| 2002/0157111 A1 * | 10/2002 | Reams | 725/112 |
| 2002/0160761 A1 * | 10/2002 | Wolfe | 455/414 |
| 2003/0004743 A1 | 1/2003 | Callegari | |
| 2003/0055721 A1 | 3/2003 | Beery, II | |
| 2003/0065805 A1 | 4/2003 | Barnes | |
| 2003/0079221 A1 * | 4/2003 | Bruner | 705/14 |
| 2003/0105641 A1 | 6/2003 | Lewis | |
| 2003/0113038 A1 | 6/2003 | Spencer et al. | |
| 2003/0132298 A1 | 7/2003 | Swartz et al. | |
| 2003/0200146 A1 * | 10/2003 | Levin et al. | 705/14 |
| 2003/0236701 A1 * | 12/2003 | Rowney et al. | 705/14 |
| 2004/0059683 A1 | 3/2004 | Epstein | |
| 2004/0103024 A1 | 5/2004 | Patel et al. | |
| 2004/0117247 A1 | 6/2004 | Agrawal | |
| 2004/0176995 A1 | 9/2004 | Fusz | |
| 2004/0199422 A1 | 10/2004 | Napier et al. | |
| 2005/0010475 A1 | 1/2005 | Perkowski et al. | |
| 2005/0038707 A1 | 2/2005 | Roever et al. | |
| 2005/0038740 A1 | 2/2005 | Ogilvie | |
| 2005/0040230 A1 | 2/2005 | Swartz et al. | |
| 2005/0102181 A1 | 5/2005 | Scroggie | |
| 2005/0119937 A1 | 6/2005 | Estes | |
| 2005/0171838 A1 | 8/2005 | Eglinton | |
| 2005/0256766 A1 | 11/2005 | Garcia | |
| 2005/0261990 A1 | 11/2005 | Gocht et al. | |
| 2006/0041478 A1 | 2/2006 | Zheng | |
| 2006/0053437 A1 | 3/2006 | Bruner | |
| 2006/0085408 A1 | 4/2006 | Morsa | |
| 2006/0167753 A1 | 7/2006 | Teague et al. | |
| 2006/0212355 A1 | 9/2006 | Teague | |
| 2006/0287871 A1 | 12/2006 | Carrozzi et al. | |
| 2007/0106608 A1 * | 5/2007 | Khandelwal | 705/40 |
| 2007/0173266 A1 | 7/2007 | Barnes | |
| 2007/0174259 A1 | 7/2007 | Amjadi | |
| 2007/0244756 A1 | 10/2007 | Stucki | |
| 2007/0265921 A1 | 11/2007 | Rempe et al. | |
| 2008/0027809 A1 * | 1/2008 | Storm | 705/14 |
| 2008/0046738 A1 * | 2/2008 | Galloway et al. | 713/176 |
| 2008/0065490 A1 | 3/2008 | Novick | |
| 2008/0077488 A1 | 3/2008 | Main | |
| 2008/0091526 A1 | 4/2008 | Shoemaker | |
| 2008/0106560 A1 * | 5/2008 | Shibusawa | 347/14 |
| 2008/0109304 A1 | 5/2008 | Sarelson et al. | |
| 2008/0109553 A1 * | 5/2008 | Fowler | 709/229 |
| 2008/0140509 A1 | 6/2008 | Amjadi | |
| 2008/0162304 A1 | 7/2008 | Ourega | |
| 2008/0172495 A1 * | 7/2008 | Storm | 709/245 |
| 2008/0183571 A1 | 7/2008 | Aaron | |
| 2008/0215426 A1 | 9/2008 | Guldimann et al. | |
| 2008/0221980 A1 * | 9/2008 | Greeson et al. | 705/14 |
| 2008/0270209 A1 * | 10/2008 | Mauseth et al. | 705/7 |
| 2008/0306782 A1 | 12/2008 | Ephrati | |
| 2009/0037325 A1 | 2/2009 | Sarelson et al. | |
| 2009/0076912 A1 * | 3/2009 | Rajan et al. | 705/14 |
| 2009/0157513 A1 | 6/2009 | Bonev et al. | |
| 2009/0234711 A1 | 9/2009 | Ramer et al. | |
| 2009/0234737 A1 | 9/2009 | Sarelson et al. | |
| 2009/0240582 A1 * | 9/2009 | Sheldon-Neal et al. | 705/14 |
| 2009/0249445 A1 * | 10/2009 | Deshpande et al. | 726/3 |
| 2009/0259547 A1 * | 10/2009 | Clopp | 705/14.16 |
| 2009/0319368 A1 | 12/2009 | Reardon et al. | |
| 2010/0036727 A1 | 2/2010 | Sarelson et al. | |
| 2010/0076836 A1 | 3/2010 | Giordano et al. | |
| 2010/0161400 A1 | 6/2010 | Snodgrass et al. | |
| 2010/0198678 A1 * | 8/2010 | Burst et al. | 705/14.39 |
| 2010/0228989 A1 | 9/2010 | Neystadt | |
| 2010/0318407 A1 * | 12/2010 | Leff et al. | 705/14.13 |
| 2011/0010235 A1 * | 1/2011 | Kenny | 705/14.23 |
| 2011/0125565 A1 | 5/2011 | MacIlwaine | |
| 2011/0153410 A1 | 6/2011 | Muthugopalakrishnan et al. | |
| 2011/0178867 A1 * | 7/2011 | King | 705/14.44 |
| 2011/0196731 A1 * | 8/2011 | Christie et al. | 705/14.26 |
| 2011/0238484 A1 * | 9/2011 | Toumayan et al. | 705/14.39 |
| 2011/0270667 A1 * | 11/2011 | Kenny | 705/14.36 |
| 2011/0295673 A1 * | 12/2011 | VanNoller et al. | 705/14.26 |
| 2011/0302034 A1 | 12/2011 | Campbell et al. | |

(56) References Cited

U.S. PATENT DOCUMENTS

| | | | |
|---|---|---|---|
| 2012/0029998 A1* | 2/2012 | Aversano et al. | 705/14.27 |
| 2012/0041805 A1 | 2/2012 | Golden et al. | |
| 2012/0096490 A1* | 4/2012 | Barnes, Jr. | 725/34 |
| 2012/0143671 A1* | 6/2012 | Hansen et al. | 705/14.39 |
| 2012/0143682 A1 | 6/2012 | Hansen et al. | |
| 2012/0143690 A1* | 6/2012 | Hansen et al. | 705/14.58 |
| 2012/0234911 A1 | 9/2012 | Yankovich | |
| 2012/0316948 A1 | 12/2012 | Shipley | |

FOREIGN PATENT DOCUMENTS

| | | |
|---|---|---|
| WO | WO9835311 A1 | 8/1998 |
| WO | WO9960489 | 11/1999 |
| WO | WO0231614 A2 | 4/2002 |

OTHER PUBLICATIONS

Final Office Action received for U.S. Appl. No. 12/506,463, mailed on Jan. 16, 2013, 38 pages.
Final Office Action received for U.S. Appl. No. 12/958,984, mailed on Feb. 14, 2013, 30 pages.
Office Action received for U.S. Appl. No. 13/028,514, mailed on Sep. 25, 2013.
Office Action received for U.S. Appl. No. 12/958,984, mailed on Mar. 26, 2015.
Office Action received for U.S. Appl. No. 12/506,463, mailed on Mar. 2, 2015.
Office Action received for U.S. Appl. No. 13/008,389, mailed on Jan. 7, 2015.
Office Action received for U.S. Appl. No. 13/291,148, mailed on Mar. 26, 2015.
Office Action received for U.S. Appl. No. 12/152,184, mailed on Nov. 12, 2014.
Office Action received for U.S. Appl. No. 12/152,184, mailed on Feb. 27, 2014.
Office Action received for U.S. Appl. No. 12/152,184, mailed on Nov. 7, 2013.
Office Action received for U.S. Appl. No. 12/152,184, mailed on May 23, 2013.
Written opinion in PCT Appl. Ser. No. PCT/US00/32497, mailed Feb. 14, 2002, 4 pages. (PCT Counterpart U.S. Pat. No. 7540415—Frank).
Authentic ID News for Automated Data Capture Systems Users, vol. 14, No. 2, An Advanstar Publication, Feb. 1998.
Kirby, Carrie. "Tickets Catapult into Syberspace," San Francisco Chronicle. Feb. 3, 2000, p. C-1. (printed Jan. 2, 2009 from http://www.sfgate.com/cgi-bin/article.cgi?f=/c/a/2000/02/03/BU75818.DTL&type=printable).
"Ticketmaster Launches Innovative Ticketing System", Entertainment Wire, Los Angeles, May 17, 1999 (printed Oct. 24, 2008 from http://findarticles.com/p/articles/mi_m0EIN/is_1999_May_17/ai_547649004/print?tag=art . . . ).
"Introduces Electronic Ticketing for Live Entertainment . . . ", San Jose, CA, Business Wire, Nov. 11, 1999 (www.admission.com), 2 pages.
Levy, Doug. "Now Boarding via Cyberspace—Airlines take high-tech route to speed check-in." USA Today, Oct. 18, 1999, p. 4.B (Money section). (printed Jan. 2, 2009 from http://pqasb.pqarchiver.com/USAToday/access/45639306.html?FMT=FT&dids=45639306 . . . ).

Levere, Jane L. "Business Travel; Alaska Airlines plans to offer a system that allows passengers to check in on the internet." New York Times, Sep. 29, 1999. (printed Jan. 2, 2009 from http://query.nytimes.com/gst/fullpage.html?res=9F04E6DF173EF93AA1575AC0A96F9582 . . . ).
eTickets.com Preliminary Business/Financial Case Summary and Funding proposal, as filed in U.S. Appl. No. 09/527,927 (U.S. Pat. No. 20030105641).
"MovieFone, Inc. Annoucnes Alliance with Magic Johnson Theatres." Busines Wire, Jan. 7, 1999 (printed Oct. 22, 2008 from http://www.allbusiness.com/media-telecommunications/movies-sound-recording/673821 . . . ).
Weintraub, Eileen et al. "A Ticket to Dot-Com Heaven?". BusinessWeek Online, Apr. 10, 2000 (printed Aug. 11, 2008 from http://www.businessweek.com/2000/00_15/b3676100.htm?scriptFramed).
Waddell, Ray. "Home Ticketing to Come?" Amusement Business, Feb. 7, 2000 (printed Aug. 11, 2008 from http://www.allbusiness.com/services/amusement-recreation-services/4559137-1.html).
"AOL Moviefone Introces 'Print-At-Home' Movie Tickets." BusinessWire, Mar. 6, 2000 (printed Aug. 11, 2008 from http://www.timewarner.com/corp/newsroom/pr/0,20812,666600,00.html).
King, Brad. "Say Goodbye to Will Call." Wired. Jun. 27, 2000 (printed Oct. 22, 2008 from http://www.wired.com/print/techbiz/media/news/2000/06/37254).
Donahue, Ann. "Web Firms Eyeing Market for Print-at-Home Tickets". Los Angeles Business Journal. Feb. 14, 2000 (printed Aug. 11, 2008 from http://www.accessmylibrary.com/coms2/summary_0286-27500711_ITM).
Rundle, Rhonda L. "New Battlefield for E-Tickets: Home Printers". The Wall Street Journal. Apr. 27, 2000, pp. B1 and B4.
Emmons, Natasha. "Ticketmaster Acquisition Has International Flavor". Amusement Business. May 8, 2000 (printed Oct. 23, 2008 from http://www.allbusineess.com/services/amusement-recreation-services/4556387-1.html).
"LinkShare Synergy Technology Overview", www.linkshare.com, Copyright 2002-2005 Linkshare Corporation.
"LinkShare Affiliate Marketing FAQ", received by Seth Sarelson from LinkShare on May 22, 2007.
"Affiliate Marketing", https://web.archive.org/web/20080224114758/http://en.wikipedia.org/wiki/Affiliate_marketing, Feb. 24, 2008.
"Commission Junction." https://web.archive.org/web/20080303211004/http://www.ci.com/case_studies.html#publishers, Mar. 3, 2008.
"LinkShare My Story", https://web.archive.org/web/2008021622593/http://linkshare.com/affiliates/mystory_bradwilson.shtml, Feb. 16, 2008.
"On-demand", www.oxfordleanersdictionaries.com/definition/english/on-demand Aug. 25, 2014.
"On-demand", www.oaadonline.oxfordlearnersdictionaries.com/dictionary/on+demand Aug. 25, 2014.
"On-demand", www.oxforddictionaries.com/definition/english/on-demand Aug. 25, 2014.
Office Action in U.S. Appl. No. 11/800,120, mailed Jul. 2, 2009.
Office Action in U.S. Appl. No. 11/888,963, mailed Aug. 5, 2009.
Office Action in U.S. Appl. No. 12/152,184, mailed Aug. 14, 2009.
Office Action in U.S. Appl. No. 12/152,184, mailed Apr. 1, 2010.
Office Action in U.S. Appl. No. 12/152,184, mailed Jan. 19, 2012.
Office Action in U.S. Appl. No. 12/152,184, mailed Jul. 6, 2012.
Office Action in U.S. Appl. No. 13/008,389, mailed Apr. 30, 2012.
Office Action in U.S. Appl. No. 12/506,463, mailed Aug. 1, 2012.
Office Action in U.S. Appl. No. 13/008,389, mailed Oct. 19, 2012.
Office Action in U.S. Appl. No. 12/958,984, mailed Oct. 25, 2012.

* cited by examiner

SYSTEM AND METHOD FOR DELIVERING AN AUTHORIZED IN-STORE PROMOTION TO A CONSUMER

CROSS-REFERENCE TO RELATED APPLICATIONS

This application is a continuation-in-part of co-pending U.S. application Ser. No. 12/958,984, entitled, "A System and Method for Delivering an Authorized In-Store Promotion to a Consumer" filed Dec. 2, 2010, the entire contents of which are hereby incorporated by reference.

STATEMENT REGARDING FEDERALLY SPONSORED RESEARCH OR DEVELOPMENT

Not applicable.

REFERENCE TO A SEQUENCE LISTING, A TABLE, OR COMPUTER PROGRAM LISTING COMPACT DISC APPENDIX

Not applicable.

BACKGROUND OF THE INVENTION

The invention relates generally to the field of sales and marketing. More particularly, the invention relates to the creation, distribution, and tracking of in-store promotions via digital distribution channels and ensuring that only authorized consumers receive the promotions.

In-store promotions are promotions that can be used at the portion of a merchant's business that takes place at a physical or "brick-and-mortar" location. Previous implementations of distributing coupons and other types of in-store promotions through digital media have had serious limitations on both the distribution and tracking of these in-store promotions as well as impeding consumer utilization. Distributing offers via digital media, if not done properly, is difficult to control and can lead to fraudulent distribution and redemptions.

Traditionally, most in-store promotions have been distributed as static images or links to static images that cannot be tracked to a distribution channel (ex. website, email, etc.) or capture more granular detail about that distribution channel (ex. paid search keywords) or consumer (ex. email address). Furthermore, these static images or links to static images can create security issues when an in-store promotion or offer is posted on an unauthorized website, sent via email, shared via social media, or shared via other distribution methods to unintended recipients due to lack of security. These issues have traditionally made advertisers reluctant to utilize digital in-store promotions because these in-store promotions are difficult to control. This reluctance to utilize digital in-store promotions has adversely affected consumers as well by decreasing the number of digital in-store promotions that advertisers make available.

Companies have attempted to address some security issues by requiring consumers to register for a service and install software on their personal computer necessary to view and print the in-store promotions (see Barnett, et al. U.S. Pat. Nos. 6,321,208 and 6,336,099). Many advertisers and consumers view a requirement to register and install software to obtain an in-store promotion as overly invasive and burdensome. These requirements have hindered adoption of digital in-store promotions by both advertisers and consumers.

Requiring user registration and client software installation enables advertisers to provide tracking and security unique to a user's computer, but creates other problems. Consumer adoption and privacy concerns are prevalent with registration and client software. The client software needs to communicate with a server via some internet connectivity and is often flagged as spyware or malware and is blocked by many firewalls and corporate proxy servers. Consumer adoption has suffered greatly with registration due to privacy concerns and lack of support across different computer operating systems. Client software does not work across all computer systems and large populations of consumers are unable to use the software due to incompatibility issues. As consumers upgrade their systems they will need to reinstall and potentially re-register the software.

Consumer registration is also limited to tracking the consumer information used when registered and, in some cases, the distribution channel in broad terms. Distribution via internet search engines, mobile phones and other media where information is dynamic is not possible. Consumer information is often not reliable due to consumers entering in fraudulent information to protect their actual information. Many free email services exist which are used as the registered email address so consumers do not provide their true email address thus defeating the tracking goal.

Technical issues with client software aside from operating system compatibility exist. Client software is often not compatible with many printers. Both old and new printers are not supported or will be lagging in support. End user support often suffers because the software vendor needs to be contacted if print issues arise. Consumers are often confused and frustrated because the website they find the in-store promotion cannot support the client software.

One of the most popular methods for distributing coupons is via email. Advertisers will often segment an email database and send special in-store promotions to different segments of the database to drive an in-store purchase with a promotion. Unfortunately, emails are often forwarded to unintended or unauthorized recipients, which can be very problematic for advertisers that have a limited budget for a promotion and only want the desired recipients to be able to access the promotion.

BRIEF SUMMARY OF THE INVENTION

The invention relates generally to a method and system for delivering an in-store promotion to a consumer. The method includes storing in a database a plurality of predetermined data fields and a plurality of tracking methods for use in creating an in-store promotion. In one embodiment, the database is a secure database for storage of in-store promotion images, in-store promotional text, barcode(s) symbology, structure, and configuration settings for each in-store promotion. The advertiser issuing the in-store promotion provides the information for the predetermined data fields so that the offer may be identified. In one embodiment, the predetermined data fields include the advertiser's/retailer's name and the type of offer. The predetermined data fields may also include the validity dates of the offer and participating store locations. In another embodiment, each component of an in-store promotion is stored separately and independently within the system so that the components may be reused, and distributed separately or in whole. The advertiser may also select one of the tracking methods.

In response to receiving a request from a consumer browser executing on a consumer device to present the in-store promotion, a server in communication with the database dynamically generates the in-store promotion using the information received from the advertiser. In generating the in-store promotion, the server does not request any additional information from the consumer operating the consumer device. Once generated, the server transmits the in-store promotion to the consumer browser. The server also does not send any client software to be stored by the consumer device.

The system provides a usable in-store promotion to an end user/consumer without the need for any registration within the system and without any client software specific to the system. In one embodiment, the in-store promotion can be represented to the consumer in the form of a printable in-store promotion, in-store promotion code, SMS/MMS/email to a mobile phone with barcode, SMS/MMS/email to mobile phone with in-store promotional code, RFID update, etc. In the various embodiments, the offer identifier may be contained in the barcode, in-store promotional code, or other applicable information per the respective delivery mechanism, but can identify information such as, but not limited to, the distribution channel, search keywords, consumer/member identifier (not registered within the system), or any other discretionary information the retailer or advertiser desires to track.

In yet other embodiments, in-store promotions can be configured with fraud protection features that are based on rules the retailer or advertiser sets. In one such embodiment, fraud protection can be turned off or used to control how many times an in-store promotion is printed, printed by a particular consumer, what websites the in-store promotion can be posted on, and/or if the in-store promotion can be forwarded to unintended consumers. In certain embodiments, each fraud protection feature can be adjusted in real time and reset in real time. In other embodiments having fraud protection, in-store promotions are delivered via links each having a unique parameter. The links are particularly effective for email, but can be used via any digital distribution channel. Each link has a unique parameter as in the following example:
http://images.revtrax.com/RevTrax/
amf.jsp?viewType=viewFull&programId=10305771&
merchantId=10231201&affiliateId=10306429&uid=
UniqueParameter
Only links that contain the registered unique parameters are authorized and therefore allowed access to the promotion. When a consumer clicks on a valid link, the user can view, print or perform other operations on the promotion. When a consumer clicks on an invalid or deactivated link, the consumer will be shown an error message or redirected to another page, such as the advertiser's loyalty/email club page.

It is therefore an object of the present invention to provide a system and method whereby in-store promotions can be distributed and tracked, along with all advertiser-requested information, without the need for consumer registration and without the need for client software installation. Another object of the invention is to provide a system which provides a mechanism to create, store and distribute in-store promotions across multi-media channels including, but not limited to, print, email, internet, mobile phone, and television. Yet another object of the invention is to prevent fraudulent use of coupons and provide a system and method whereby in-store promotions are delivered only to authorized consumers.

BRIEF DESCRIPTION OF THE DRAWINGS

The invention is pointed out with particularity in the appended claims. The above and further advantages of this invention may be better understood by referring to the following description taken in conjunction with the accompanying drawings, in which:

The attached drawings are intended to better illustrate the present invention without limiting it in any manner whatsoever. Like reference characters in the respective drawn figures indicate corresponding parts or steps.

Detailed Description of The Invention

Figure 1A:
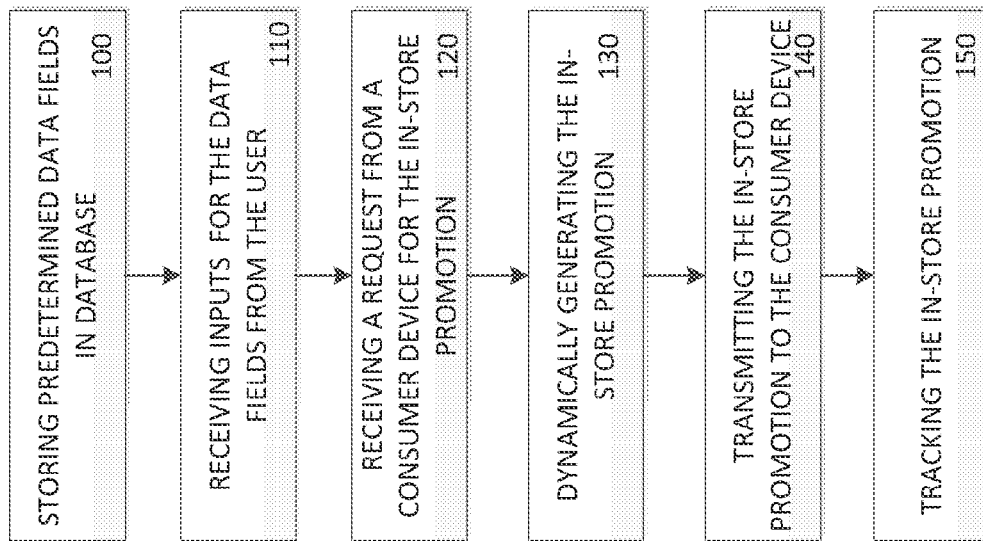
FIG. 1A is a flowchart representation of an embodiment of a process for delivering an in-store promotion to a consumer according to the present invention.

Referring to FIG. 1A and in brief overview, an embodiment of a method for delivering an in-store promotion to a consumer includes storing in a database a plurality of predetermined data fields for use in creating an in-store promotion in step 100. A consumer may be an individual or any other entity to which the advertiser desires to present with the offer. The predetermined data fields are to be completed by the advertiser or the advertiser's agent to define the in-store promotion. In various embodiments, the advertiser may be a retailer, a service provider such as a restaurant, a manufacturer, an advertising agency, or any other entity or person who desires to provide a promotion to a consumer. The retailer, advertiser or other entity offering a promotion may also be referred to herein as the "user". In one embodiment, the database further includes a plurality of tracking methods that may be selected by the advertiser to track the in-store promotion. In one embodiment, the database is a secure database for storage of in-store promotion images, in-store promotional text, barcode(s) symbology, structure, and configuration settings for each in-store promotion. Next, in step 110, the advertiser issuing the in-store promotion provides the information or inputs for the predetermined data fields so that the offer may be identified. In one embodiment, the predetermined data fields include the advertiser's/retailer's name and the type of offer. The predetermined data fields may also include the validity dates of the offer and participating store locations. In yet another embodiment in which the in-store promotion will include a bar code, the plurality of predetermined data fields includes selectable bar code structures. The advertiser must provide inputs for a sufficient number predetermined data fields so that the offer may be identified. In another embodiment, each component of an in-store promotion is stored separately and independently within the system so that the components may be reused, and distributed separately or in whole. The advertiser may also select one of tracking methods. The advertiser may also input an element not previously stored in the database to include in the in-store offer.

Next, in step 120, the system receives a request from a consumer device for the in-store promotion. In response to receiving a request from a consumer device to present the in-store promotion, a server in communication with the database dynamically generates the in-store promotion using the information received from the advertiser in step 130. In generating the in-store promotion, the server does not request any additional information from the consumer operating the consumer device. In one embodiment, the request is sent from a consumer browser operating on a consumer device. In another embodiment, the request is sent by the consumer invoking a hyperlink. In yet another embodiment, the request may be received via an email, SMS or text message, or any other method for communicating a request to the server.

In one embodiment, the server dynamically generating the in-store promotion generates an offer identifier that may be used to identify the in-store promotion. The offer identifier may be a bar code, a bar code capable of being read by a point of sale device at a store, an in-store promotional code or any other picture, text, sound, graphic or other identifying mechanism that may be used to identify the offer. In an embodiment in which the server generates a bar code, the bar code may be an additional bar code to a bar code the advertiser has already placed on the in-store offer. In yet another embodiment, the offer identifier is included a single bar code placed on the in-store offer. In this embodiment, the single bar code conveys all the information required by the advertiser and is in a format already recognized by the advertiser's equipment.

Once generated, in step 140 the server transmits the in-store promotion to the consumer device. In transmitting the promotion to the consumer, the server does not send any system-specific client software to be stored by the consumer device. The system provides a usable in-store promotion to an end user/consumer without the need for any registration within the system and without any client software specific to the system. In one embodiment, the server transmits the in-store offer to the consumer device through an electronic communication channel. In one embodiment, the in-store promotion can be represented to the user in the form of a printable in-store promotion, in-store promotion code, SMS/MMS/text message/email to a mobile phone with barcode, SMS/MMS/text message/email to mobile phone with in-store promotional code, RFID update, etc. In the various embodiments, the offer identifier may be contained in the barcode, in-store promotional code, or other applicable information per the respective delivery mechanism, but can identify information such as, but not limited to, the distribution channel, search keywords, consumer/member identifier (not registered within the system), or any other discretionary information the retailer or advertiser desires to track.

As described above, the advertiser may select a tracking method. In an embodiment of the system in which the advertiser has selected a tracking method, the system proceeds to step 150 and tracks the in store promotion upon the consumer accessing the in-store promotion. In yet another embodiment in which the advertiser selects a tracking method, the system tracks the consumer selecting to print the in-store promotion. In still another embodiment, the system uses the tracking method to track the in-store promotion once the consumer redeems the in-store promotion at a store. The tracking methods may include methods for tracking distribution channels, search keywords entered into a browser and/or consumer identification information, or any other discretionary information the retailer or advertiser desires to track.

In one embodiment, in order to track the promotion, the system includes identifying information in the offer identifier. The identifying information may identify the method through which the offer was distributed to the consumer, the internet search words used by the consumer in locating the offer, consumer identification information, or other information the advertiser desires to track. For example, if the consumer requested the offer by invoking a URL, the offer identifier could identify the URL or a reference to the URL that the consumer invoked. The URL could then be tracked in the promotion. In another embodiment, the offer identifier could identify the IP address of the consumer's device or a reference to the IP address of the consumer's device. The IP address of the consumer's device could then be tracked in the promotion. In still another embodiment, if the consumer requested the offer by invoking a URL that contained or passed the consumer's membership or privilege card identifier (previously associated with the consumer), the offer identifier may include the consumer's membership or privilege card identifier. The consumer information may be tracked back to the consumer by the system, or it may be tracked back to the consumer by a separate system maintained by the advertiser. In yet another embodiment, the system stores the tracking information and information that may be later matched with the tracking system is included in the offer identifier. For example, the system may include the number 123 in the offer identifier, and the system may associate the number 123 with a specific consumer member number. When the offer with the number 123 in the offer identifier is redeemed, the system will determine that the number 123 is associated with the consumer member number and will determine that the specific consumer redeemed the offer. In other embodiments, the consumer information may be tracked back to the consumer by the system, or it may be tracked back to the consumer by a separate system maintained by the advertiser. For example, the system may share with the advertiser that the number 123 was assigned to a specific consumer member number and then the advertiser or advertiser's system the specific consumer that redeemed the offer.

In still another embodiment, the system may generate and send a cookie to the consumer's device. It is important to note that the cookie is not application-specific software that is required to be stored or executed by the consumer device in order for the consumer to receive/print/redeem the offer. In one such embodiment, the offer identifier includes information for the cookie.

In yet other embodiments, in-store promotions can be configured with fraud protection features that are based on rules the retailer or advertiser sets. In one such embodiment, fraud protection can be turned off or used to control how many times an in-store promotion is printed, printed by a particular consumer, what websites the in-store promotion can be posted on, and/or if the in-store promotion can be forwarded to unintended consumers. In certain embodiments, each fraud protection feature can be adjusted in real time and reset in real time.

Figure 1B:
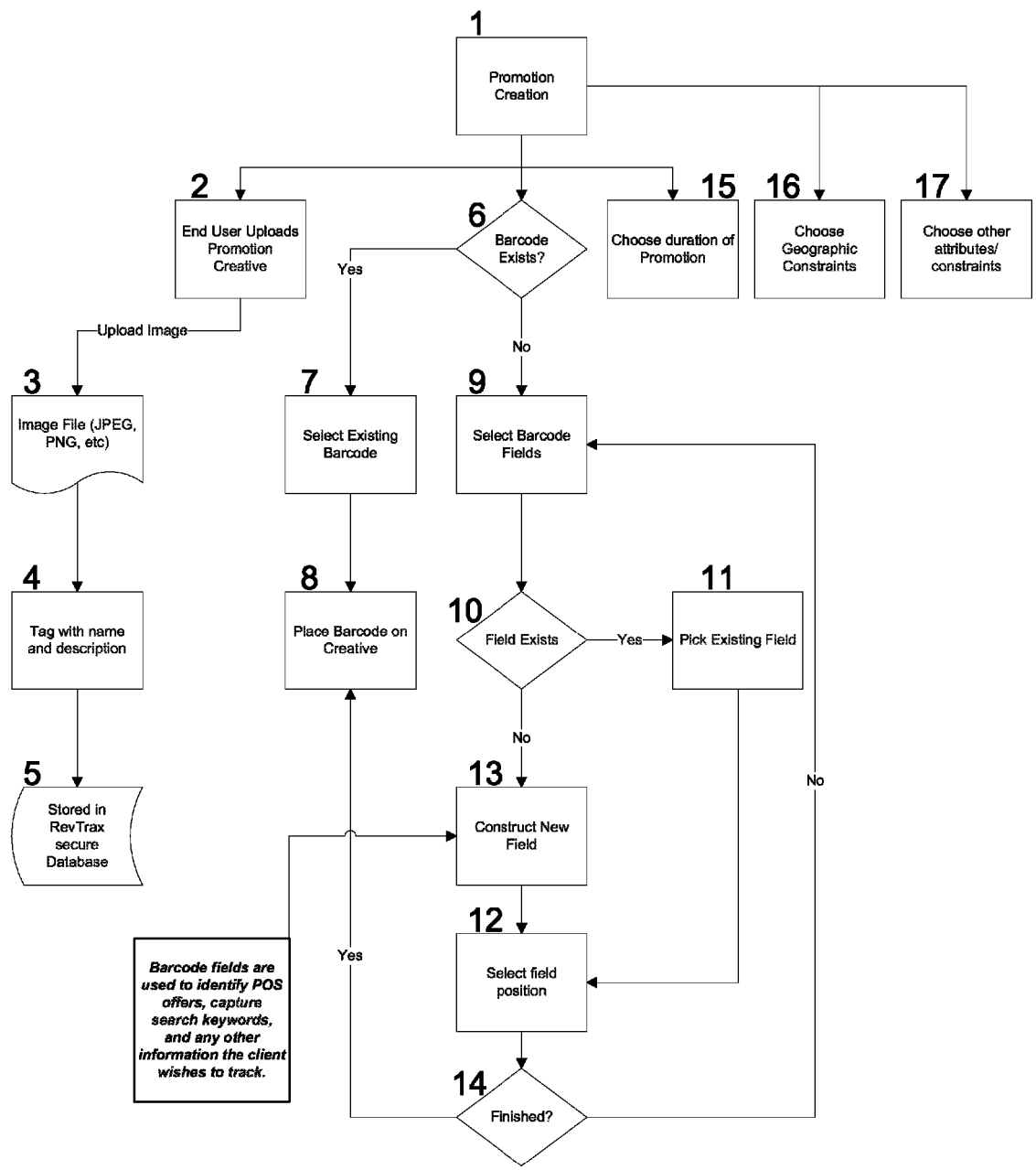
FIG. 1B is a flowchart representation of an embodiment of a process for creating an in-store promotion according to the present invention.

Referring to FIG. 1B, an embodiment of a method for creating an in-store promotion is shown. In one embodiment, the system provides for the creation and management of in-store promotions through a user interface that is accessible to the advertiser (user) via a secure login. In addition, the user may have fine grained control over the distribution channels. In step 1, the retailer, advertiser or other entity offering a promotion creates the promotion. As described above, the retailer, advertiser or other entity offering a promotion may also be referred to herein as the "user". Next in step 2, the user uploads a promotion creative. The promotion creative may include the "look and feel" of the in-store promotion that the consumer views. Different in-store promotion creative may be applicable or better suited for different types of distribution channels. The promotion creative may be an image file, text file, sound file, video file or any combination of the foregoing. Advertisers can upload any in-store promotion creative of their choice. In-store promotion creative can also be used for multiple in-store promotions if desired. In the example shown in the flowchart of FIG. 1B, the promotion creative is an image file such as a JPG, PNG, or any other type of image file. In step 3, the image file is received by the promotion server, which in turn tags the image file with a name and description in step 4 and then stores the file in a creative library or database in step 5. By storing the promotion creative, the creative is available for use in other in-store promotions. The dimensions and layouts of the in-store promotion creative may be selected by the user.

Once the in-store promotion creative has been uploaded, in one embodiment, the user may select to include a barcode(s) (and the position of the barcode(s)) and dynamic text (optional) or logos. The dynamic in-store promotion text can be specified at run-time through the distribution channel or can be calculated text, such as an expiration date. The dynamic text can be provided either at run time or through predetermined fields such as "expiration date". In yet other embodiments, the user may provide high level information of the in-store promotion such as begin date, end date, or other information.

In an embodiment in which the user (advertiser) desires to include a barcode, the process of creating a new barcode includes choosing the appropriate fields in length and position to capture the desired information. In one such embodiment, the barcodes include fields for both point-of-sale usage as well as for capturing data. Additional bar code fields can be created to capture data not previously captured. Referring again to FIG. 1B, in an embodiment in which the user desires to include a barcode, in step 6 the user determines if the desired barcode structure for the promotion exists in the system. If a desired barcode layout exists already in the system, it may be chosen from the list of existing barcode layouts. If not, the user may create a new barcode layout, which is then stored as a library element in the user's account for use in future promotions. If the desired barcode structure exists, the user may select it for the promotion in step 7 and place it on or associate it with the creative in step 8. The user may also select the position of the barcode. In one embodiment, barcodes are overlaid on the in-store promotion at runtime and can be positioned anywhere on the in-store promotion.

If the desired barcode structure does not exist in the system, in step 9 the user creates a new barcode by selecting from available barcode fields. If the user determines that the desired field exists in step 10, the user can select the existing field in step 11 and then in step 12 select the position for the field within the barcode structure. If the user determines that the desired field does not exist in step 10, the user can construct a new field in step 13 and then proceed to step 12 and select a position for the field within the barcode structure. Fields can also be created to capture information not previously available. There is no limit to the information that can be captured in a barcode.

If in step 14, the user determines that the barcode is not complete, the user returns to step 9, selects additional barcode fields and repeats the process. This process of choosing and/or creating barcode fields continues until enough fields are in the barcode to both identify the offer at the point of sale ("POS") and capture the desired information. If in step 14 the user determines that the barcode is complete, the process returns to step 8 and the barcode is placed on or associated with the creative. In other embodiments, the user specifies a start date and expiration date for the promotion (step 15), adds geographic constraints (step 16), and/or other attributes/constraints (step 17) for the promotion. In one embodiment, the start date is the date when the in-store promotion is available for distribution to consumers. In another embodiment, the end date is the date after which the in-store promotion is no longer available for distribution to consumers.

Figure 2:
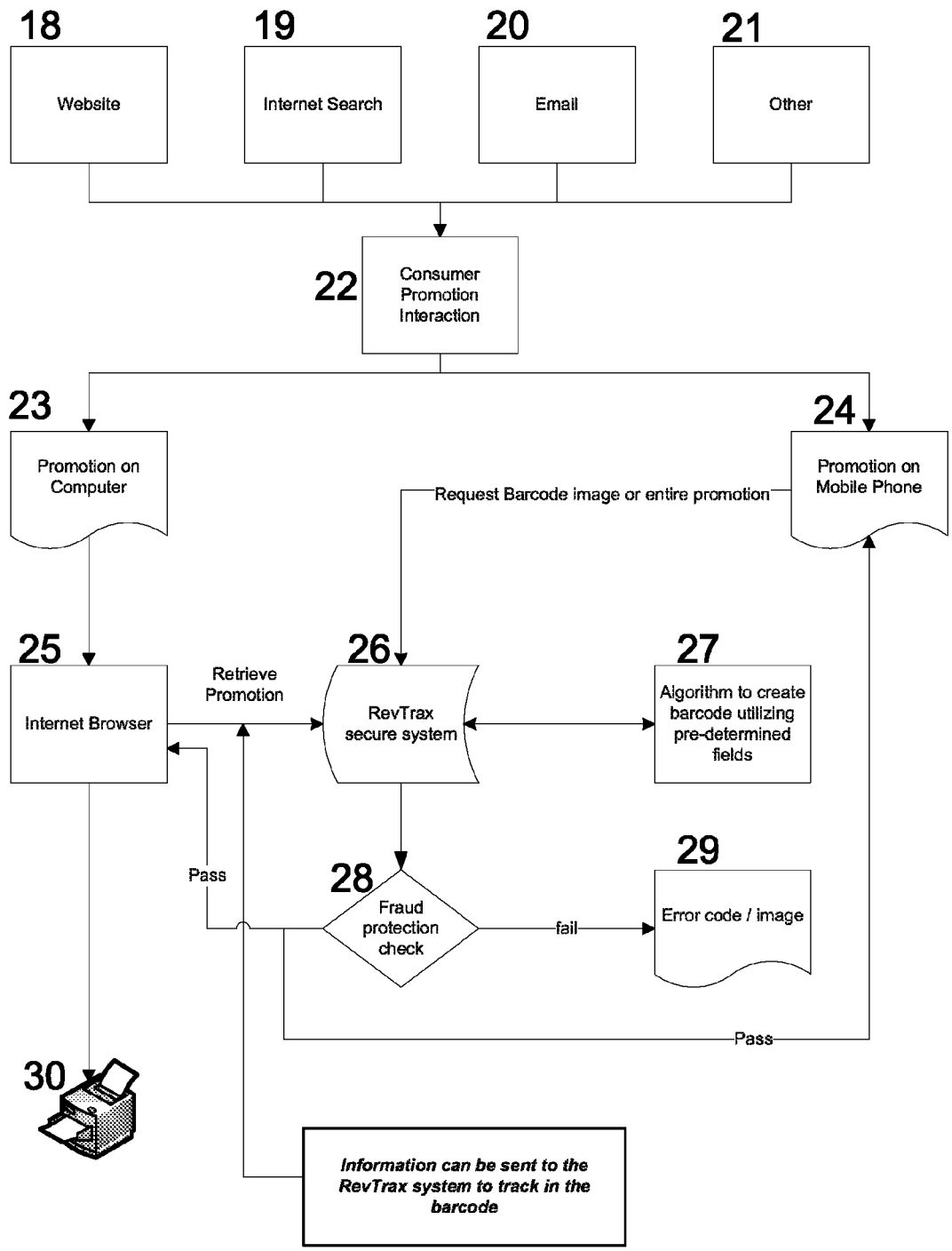
FIG. 2 is a block diagram an embodiment of a system according to the present invention illustrating typical consumer interactions with an in-store promotion created using the system.

As best shown in FIG. 2, distribution channels for an in-store promotion may include the Internet (through either websites or search results), email delivery and mobile phone delivery. Therefore, a consumer may utilize a website 18, internet search 19, email 20, or other method 21 to interact with a promotion 22. The promotion may be accessed via a computer 23, mobile phone 24, or other device. If the promotion is accessed via a computer 23, in one embodiment, the computer's internet browser 25 requests the promotion from the secure system 26, which then uses an algorithm to create the barcode/promo code utilizing pre-determined fields 27 and validates the request against any security/fraud protection rules 28. If the request fails the check against the security/fraud protection rules 28, the consumer sees an error code/image 29. If the request passes the check against the security/fraud protection rules 28, the promotion is sent back to the consumer's internet browser 25 and the consumer is able to send the promotion to the printer 30 without any type of software download required.

If the promotion is accessed via a mobile phone 24, the mobile phone requests the promotion from the secure system 26, which then uses an algorithm to create the barcode/promo code utilizing pre-determined fields 27 and validates the request against any security/fraud protection rules 28. If the request fails the check against the security/fraud protection rules 28, the consumer sees an error code/image 29. If the request passes the check against the security/fraud protection rules 28, the promotion is sent back to the consumer's mobile phone 24.

Distribution channels include the internet (including but not limited to websites and search results), email delivery, mobile phone and any other technology that is able to transmit the promotion to the consumer's device. The consumer may view the in-store promotion on the internet or via an email. The consumer may open the in-store promotion in any web browser without any additional software and no registration. All fraud protection elements of the promotion are run and checked against the available data. The consumer can print the in-store promotion on any printer capable of printing graphics (no special software is required) or utilize the image on a mobile phone.

Figure 3:
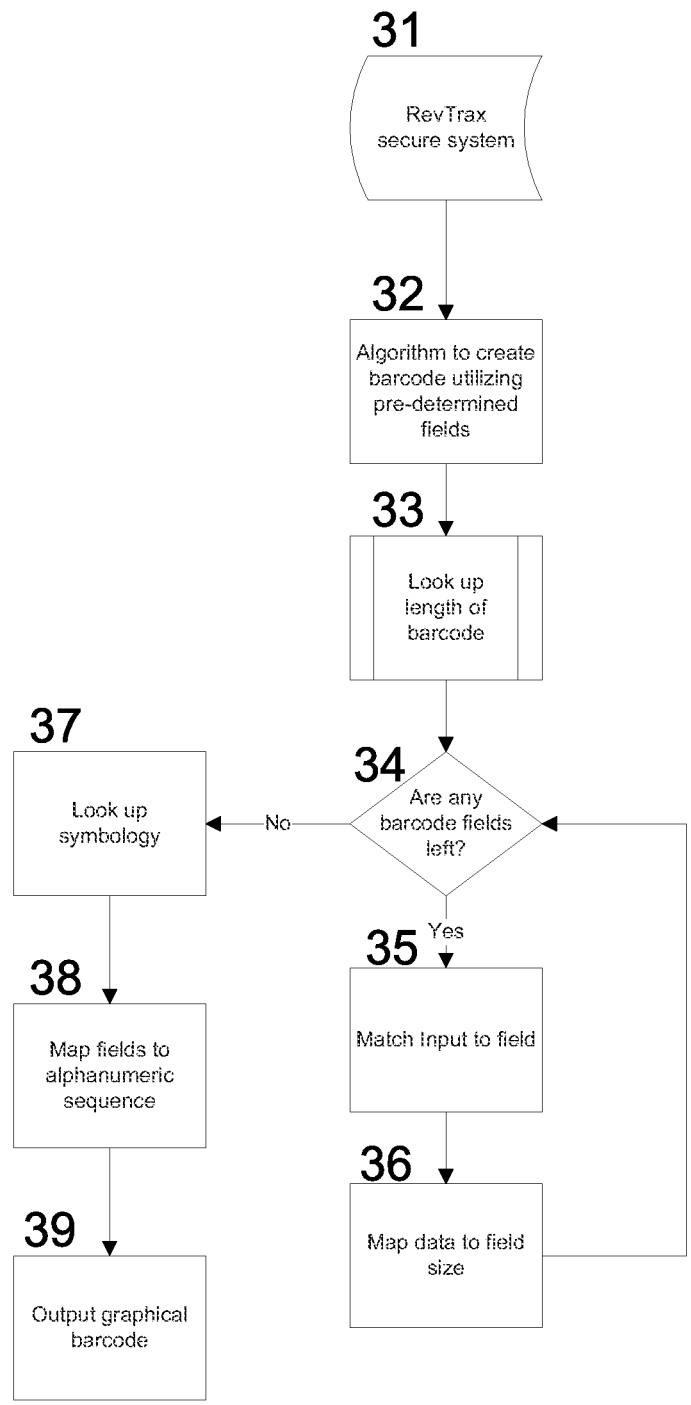
FIG. 3 is a flowchart representation an embodiment of a process for generating a barcode according to the present invention.

In one embodiment including barcodes in the offer, the barcodes are generated in real time utilizing all available data. The request to deliver an in-store promotion and/or a barcode and each field in the barcode is analyzed and the data is gathered. The data that covers all fields is run through an algorithm which ensures the length of the barcode and content matches the advertiser's specifications. As best shown in FIG. 3, when the secure system receives a request for a promotion in step 31, the secure system utilizes an algorithm to create a barcode utilizing predetermined fields in step 32. The system then looks up the pre-determined length of the barcode in step 33. The system then creates at least one barcode field and checks if any barcode fields are left in step 34. If any barcode fields are left in step 34, the system matches a data input to the field in step 35, and maps the data to the field, ensuring that the data fits the pre-determined field size in step 36. If any barcode fields are not left in step 34, the system looks up the predetermined symbology of the barcode in step 37, then maps the fields to an alphanumeric sequence in step 38 and generates a graphical barcode as an output in step 39.

As described above in the discussion of FIG. 2, the barcode fields that are used to capture data can be chosen from a library of fields. Fields can be created at the discretion of the advertiser to satisfy the advertiser's data capture requirements. The field lengths and the field positions may be at the discretion of the advertiser's. The barcode symbology may also be chosen by the advertiser. For example, the advertiser may select from: UPC, Code 128, EAN, GS1 Databar, QR Codes, and other type of barcode symbologies. Each of the data fields are mapped to available data that is provided to the system at runtime. When the in-store promotion is viewed, the distribution channel requests the in-store promotion from the server with all available data. The data is matched to each barcode field and formatted to fit the format specified by the advertiser. Depending on the selections of the advertiser, the same data can result in different bar codes, and may capture the same or different information for different in-store promotions.

Figure 4A:
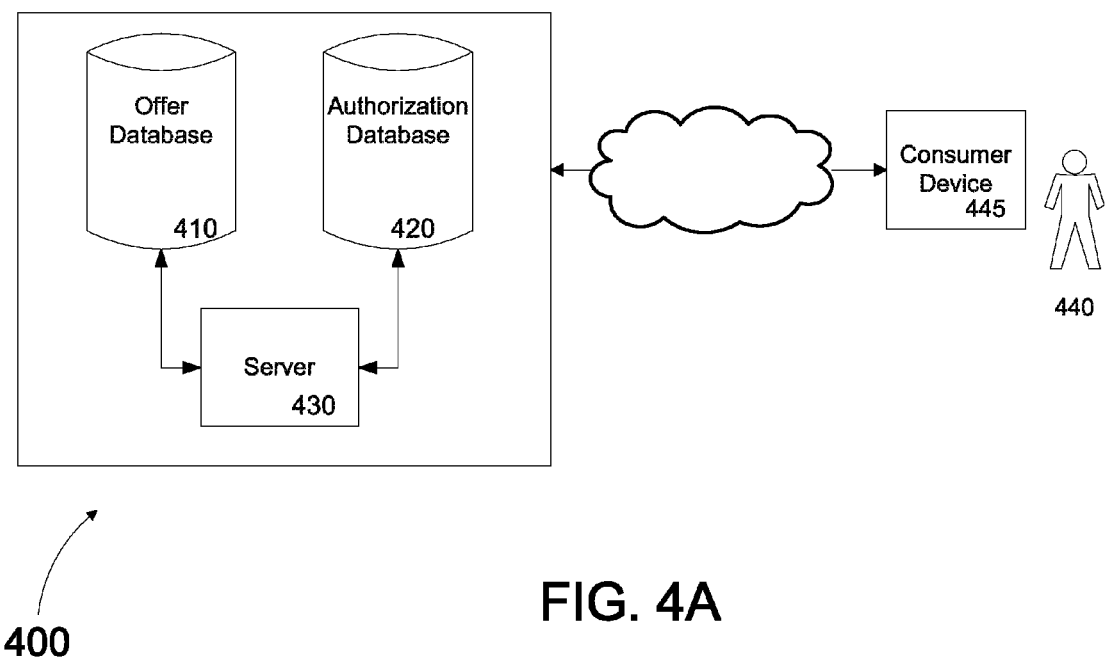
FIG. 4A is a block diagram of an embodiment of a system for delivering authorized in-store promotions to consumers.

Referring now to FIG. 4A, an embodiment of a system 400 for preventing fraud and helping to ensure that only authorized consumers receive the in-store promotion is shown. The fraud prevention system 400 includes an offer database 410, an authorization database 420 and a server 430. The offer database 410 stores a plurality of offer data items for use in creating the in-store promotion. The plurality of offer data items may be fields for the user/advertiser to enter information, promotion creative such as image files, text files, sound files, video files or any combination of the foregoing, and any other of the items discussed above for use in creating an in-store promotion. The authorization database stores authorization parameters. In one embodiment, each in-store promotion sent to a consumer receives a unique authorization parameter. In another embodiment, the same authorization parameter may be used for all the targeted consumers in a campaign. The authorization parameter may be a number, an alphanumeric code, or any other identifier that may be included in a link to an in-store promotion.

Figure 4B:
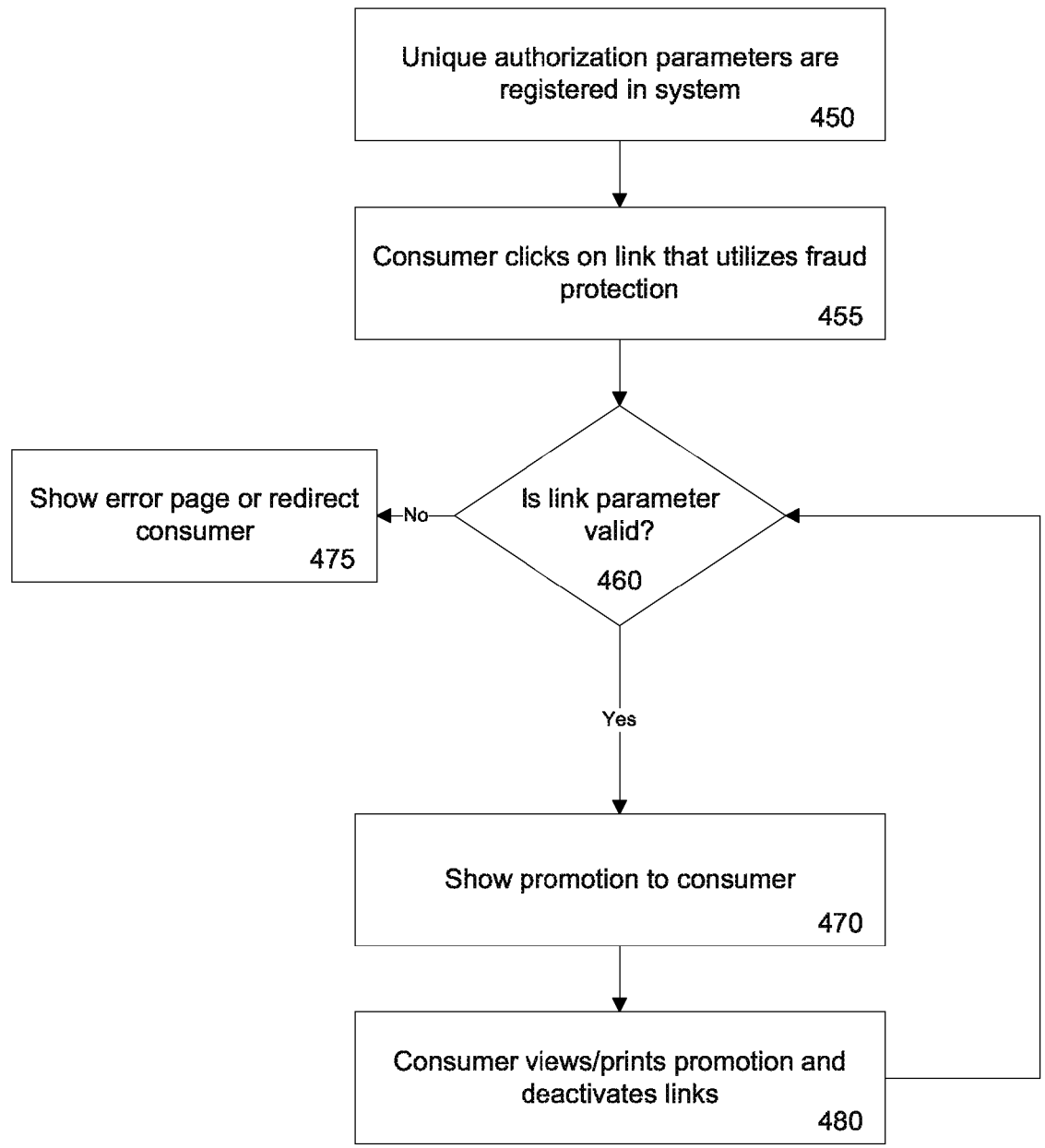
FIG. 4B is a flowchart representation of an embodiment of a process for determining if a consumer is authorized to receive an in-store promotion according to the present invention.

The operation of the system 400 will be described in more detail using the flowchart of FIG. 4B. In step 450, unique authorization parameters for promotion links are registered in the system 400 and stored in the authorization database 420. Next, links to the in-store promotion containing the authorization parameters are sent to consumers. In step 455, a consumer 440 invokes the link to the promotion using a consumer device 445. Upon the consumer 440 invoking the link, the server 430 receives a request from the consumer device 445 to present the in-store promotion. Next, in step 460, the server 430 checks the link parameters using information from the authorization database 420 to verify that the link is valid and the request is authorized. The server 430 does not request any additional information from the consumer 440 operating the device 445 to perform the verification.

If the link is valid (i.e. contains the authorization parameter) and the request is authorized, the system 400 proceeds to step 470 and the server 430 dynamically generates the in-store promotion using at least one of the plurality of data items stored in the offer database 410 and transmits the in-store promotion to the consumer device 445. The consumer 440 may then view, print or perform another operation on the in-store promotion on the consumer device 445 in step 480.

If the link is not valid (i.e. does not contain the authorization parameter), the request is not authorized and the system 400 proceeds to step 475. In step 475, the server 430 presents an error page to the consumer 440 or redirects the consumer 440 to another page, such as the advertiser's loyalty/email club program sign up page.

In other embodiments, when the user creates the in-store promotion, the user may select a single authorization parameter or a plurality of authorization parameters to be verified by the server. In yet another embodiment, the use of the authorization parameter and the authorization parameter itself are configurable by the user. For example, the authorization parameter in one embodiment may be the number of times that an in-store promotion may be printed. In this example, the user may specify the quantity. In an embodiment that the in-store promotion may only be printed a single time, to verify that the request to present an in-store promotion is valid, the server 430 must determine whether the in-store promotion was previously requested to be printed by the consumer device 445. If the user specifies that the in-store promotion may be printed no more than N times, N being a whole number greater than 1, the server 430 may track whether the in-store promotion is printed. In one such embodiment, the system 400 may track a browser identifier of the browser executing on the consumer device 445.

In another embodiment, the authorization parameter limits websites posting the in-store promotion. In order to determine if the request to present the in-store promotion is authorized, the server 430 determines whether the in-store promotion is requested through an authorized website. In one such embodiment, the authorization database 420 stores the domains of authorized websites and the server 430 verifies that the domain of a website through which the request is received is one of the authorized websites.

In still another embodiment, the authorization parameter restricts forwarding of the in-store offer by the consumer device 445.

Having described various embodiments of the invention, it will now become apparent to one of ordinary skill in the art that other embodiments incorporating the concepts may be used. It is felt, therefore, that these embodiments should not be limited to the disclosed embodiments, but rather should be limited only by the spirit and scope of the following claims.

What is claimed is:

1. A method for digitally delivering an authorized in-store promotion from a server computer for a service to a consumer device for a consumer through a digital communication channel, comprising the steps of, without the need for consumer registration for the service and without requiring software for the service on the consumer device to print in-store promotions from the service:

storing in an offer database on a computer a plurality of offer data items for use in creating an in-store promotion;

storing in an authorization database on a computer a plurality of unique authorization parameters, each unique authorization parameter being associated with an in-store promotion;

receiving a selection from a user of an authorization parameter to be verified by the server computer, when the user creates the in-store promotion, wherein the authorization parameter is configurable by the user;

generating a plurality of hyperlinks to the in-store promotion and including in each hyperlink a different one of the plurality of unique authorization parameters;

distributing the plurality of hyperlinks over one or more digital communication channels to consumer devices for consumers, without requiring the consumers to be registered with the service;

in response to a consumer invoking a first hyperlink of the plurality of hyperlinks on a consumer device, receiving at the server computer a request from the consumer device to present the in-store promotion, wherein the request includes at least a first unique authorization parameter, of the plurality of unique authorization parameters, included in the first hyperlink;

verifying by the server computer that the request is authorized by using the authorization database, the first unique authorization parameter included in the request, and the authorization parameter selected by the user, and without requesting additional information from the consumer operating the consumer device;

in response to verifying the request is authorized, dynamically generating, by the server computer, the requested in-store promotion using at least one of the plurality of offer data items stored in the offer database; and transmitting the dynamically generated in-store promotion from the server computer to the consumer device through a digital communication channel without requiring the consumer device to have software from the service for the consumer device to print the in-store promotion.

2. The method of claim 1 wherein a user may select one or more of a plurality of authorization parameters to be verified prior to the sever computer dynamically generating the in-store promotion.

3. The method of claim 1 further comprising the step of:
transmitting an error message over a digital communication channel from the server computer to the consumer device if the request is not authorized.

4. The method of claim 1 further comprising the step of:
redirecting the consumer device if the request is not authorized.

5. The method of claim 1 wherein the consumer device executes a browser, the method further comprising the server computer receiving a browser identifier with the request.

6. The method of claim 1 wherein the authorization parameter limits websites posting the in-store promotion and wherein the step of verifying that the request is authorized comprises determining whether the in-store promotion is requested through an authorized website.

7. The method of claim 6, further comprising the step of storing domains of authorized websites and the step of verifying further comprises the step of verifying a domain of a website through which the request is received.

8. The method of claim 1 wherein the authorization parameter restricts forwarding of the in-store offer by the consumer device.

9. A computer system for delivering delivering an authorized in-store promotion from a server computer for a service to a consumer device for a conaumer through a digital communication channel, the system comprising:

an offer database on a computer storing a plurality of offer data items for use in creating an in-store promotions;

an authorization databaseon a computer storing a plurality of unique authorization parameter; each unique authorization parameter being associated with an in-store promotion; and a server in communication with the offer database and the authorization database, wherein the server computer is configured to receive a selection from a user of an authorization parameter to be verified by the sever computer, when the user creates the in-store promotion, wherein the authorization parameter is configurable by the user;

wherein the server computer is further configured to generate a plurality of hyperlinks to the in-store promotion and to include in each hyperlink a different one of the plurality of unique authorization parameters;

wherein the server computer is configured to distribute the plurality of hyperlinks over one or more digital communication channels to consumer devices for consumers, without requiring the consumers to be registered with the service, and wherein, in response to a consumer invoking a first hyperlink of the plurality of hyperlinks on a consumer device, the server computer is configured to receive a request from the consumer device to present the in-store promotion, wherein the request includes at least a first unique authorization parameter, of the plurality of unique authorization parameters, includes in the first hyperlink, wherein the server computer is configured to verify that the request is authorized by using the authorization database, the first unique authorization parameter included in the request, and the authorization parameter selected by the user, and without requesting additional information from the consumer operating the consumer device;

wherein the server computer is configured to dynamically generate, after verifying that the request is authorized, the requested in-store promotion using at least one of the plurality of offer data items stored in the databases; and wherein the server computer is configured to transmit the dynamically generated in-store promotion to the consumer device over a digital communication channel without requiring the consumer device to have software from the service for the consumer device to print the in-store promotion.

10. The computer system of claim 9 wherein the user may select one or more of a plurality of authorization parameters to be verified by the server computer prior to dynamically generating the in-store promotion.

11. The computer system of claim 9 wherein use of the authorization parameter is configurable by a user.

12. The computer system of claim 9 wherein the server computer transmits an error message over a digital communication channel to the consumer device if the request is not authorized.

13. The computer system of claim 9 wherein the server computer redirects the consumer device if the request is not authorized.

14. The computer system of claim 9 wherein the consumer device executes a browser and the server computer tracks a browser identifier.

15. The computer system of claim 9 wherein the authorization parameter limits websites posting the in-store promotion and wherein the server computer determines whether the in-store promotion is requested through an authorized website to verify that the request is authorized.

16. The computer system of claim 15, wherein the authorization database stores domains of authorized websites and the server computer compares a domain of a website through which the request is received with the domains of authorized websites stored by the authorization database.

17. The computer system of claim 9 wherein the authorization parameter restricts forwarding of the in-store offer by the consumer device.

* * * * *